(12) United States Patent
Laucht et al.

(10) Patent No.: US 6,332,399 B1
(45) Date of Patent: Dec. 25, 2001

(54) IGNITING ELEMENT

(75) Inventors: Horst Laucht, Bruckmuehl; Gerhard Mueller, Grafing; Wolfgang Welser, Kirchheim, all of (DE)

(73) Assignees: DaimlerChrysler AG, Stuttgart; TRW Airbag Systems GmbH & Co. KG, Aschau, both of (DE)

( * ) Notice: Subject to any disclaimer, the term of this patent is extended or adjusted under 35 U.S.C. 154(b) by 0 days.

(21) Appl. No.: 09/302,484

(22) Filed: Apr. 30, 1999

(30) Foreign Application Priority Data

Apr. 30, 1998 (DE) .............................. 198 19 428

(51) Int. Cl.[7] .................. F42B 3/10; F42B 3/12
(52) U.S. Cl. .............. 102/206; 102/206; 102/202.5; 102/215; 102/216; 102/218; 102/220
(58) Field of Search ............... 102/206, 215–216, 102/218, 220, 202.5

(56) References Cited

U.S. PATENT DOCUMENTS

| | | | |
|---|---|---|---|
| H1366 | * 11/1994 | Bickes, Jr. et al. | 102/202.5 |
| 3,672,303 | * 6/1972 | Brawn | 102/70.2 |
| 4,381,967 | * 5/1983 | Sanders et al. | 156/643 |
| 4,484,523 | 11/1984 | Smith et al. | 102/202.5 |
| 4,708,060 | * 11/1987 | Bickes, Jr. et al. | 102/202.7 |
| 4,819,560 | 4/1989 | Patz et al. | 102/202.5 |
| 4,990,889 | * 2/1991 | Lebsock | 340/515 |
| 5,703,521 | 12/1997 | Gantioler et al. | 327/512 |
| 5,861,570 | * 1/1999 | Bickes, Jr. et al. | 102/202.7 |
| 5,898,122 | * 4/1999 | Davis et al. | 102/206 |

FOREIGN PATENT DOCUMENTS

| | | |
|---|---|---|
| 33 22 990 A1 | 1/1985 | (DE) . |
| 37 17 149 | 11/1987 | (DE) . |
| 195 36 573 C1 | 9/1995 | (DE) . |
| 2 123 122 A | 1/1984 | (GB) . |
| 10-100855 | 4/1998 | (JP) . |

OTHER PUBLICATIONS

Product Engineering/May 22, 1967, vol. 38, p. 20, "Developments to Watch".
European Search Report and translation of relevant portions thereof.

* cited by examiner

*Primary Examiner*—Michael J. Carone
*Assistant Examiner*—Lullit Semunegus
(74) *Attorney, Agent, or Firm*—Crowell & Moring LLP

(57) ABSTRACT

An igniting element, such as is used in a vehicle air bag igniter reduces the power dissipated by the air bag ignition circuit, as well as its space requirement and its costs, by using the ignition switch/switches as the ignition element (7) itself of the ignition circuit. The ignition circuit is integrated in a silicon chip, and has at least one ignition switch constructed as a transistor.

10 Claims, 3 Drawing Sheets

IGNITING ELEMENT

BACKGROUND AND SUMMARY OF THE INVENTION

This application claims the priority of German patent document 198 19 428.5, filed Apr. 30, 1998, the disclosure of which is expressly incorporated by reference herein.

The invention relates to an igniting element for an ignition circuit such as is provided in an air bag igniter.

In current air bag systems, the air bag igniters are ignited individually by a central control via a discrete line. For this purpose, an ignition capacitor, two ignition switches as well and a diagnostic logic per ignition circuit are included in the control unit. The principal disadvantages of this design: i) only approximately one third of the energy stored in the ignition capacitor is transferred to in the igniting element (approximately 6 Ω total resistance at 2 Ω ignition element resistance), ii) the energy converted in the ignition switches must be discharged to the substrate by good thermal conduction, iii) the surface of the ignition switches is determined by the switching current, the converted energy and the heat dissipation, and iv) the implementation of the circuit in silicon demands a double surface requirement for the ignition switches and the igniting element (German Patent Document DE 37 17 149 A1).

In each case, the diagnostic logic tests the function of the individual ignition switches, the total specific resistance of the ignition circuit and the connections of the line toward plus or ground.

Newer concepts of air bag ignition include a semiconductor ignition circuit which is coupled directly to the igniter, and which is remote-controlled from the central control unit by way of an ignition bus. This eliminates the specific resistance of the ignition circuit. Nevertheless, a ratio of approximately 1:1 still remains between the power dissipated at the ignition switches and the actual ignition output. The power dissipated at the ignition switches significantly influences the size of the ignition circuit constructed as an integrated semiconductor circuit and the size of the ignition capacitor.

It is an object of the invention to provide an ignition circuit which reduces the amount of power dissipation, the space requirement.

Another object of the invention is to reduce the costs of an air bag ignition circuit.

These and other objects and advantages are achieved by the ignition element according to the invention, which uses the "dissipation power" of the ignition switches to support the ignition. That is, the ignition switches themselves represent the igniting element, and the igniting element as an additional component is eliminated. The advantages of the solution according to the invention are that the dissipation power is equal to zero because the ignition switches themselves represent the igniting element. When implemented in silicon, only a single surface is required, and this surface requirement can be further reduced by the use of "high-loss" ignition switches. The surface of the ignition switches depends only on the pyrotechnics to be applied.

The required ignition energy can advantageously be reduced by thermal insulation of the ignition switches with respect to the substrate. Moreover, diagnosis can take place as in the previous solution, by testing the functioning of each of the two ignition switches. However, the need to test the specific resistance is eliminated. As indicated below, as an alternative, a function test can be carried out by means of a diode.

A further improvement of the system can be achieved by using only one ignition switch, and/or by performing the diagnosis by means of a separate sensor element (diode) via dynamic temperature measurement, so long as the test signal is below the ignition threshold. An additional advantage of this arrangement is that, for implementation in silicon, only a single, small amount of space is required. In this case, the diagnosis advantageously takes place by dynamic temperature measurement when the test signal is generated by the diagnostic logic, thereby permitting an actual function test at temperatures below the ignition threshold.

If, for reasons of safety, redundant switching is required, using two separate switches so that a single fault does not trigger the igniter, a second ignition switch may be connected on the input side. Another advantage of this arrangement is technological redundancy can be achieved by using different technologies for the two ignition switches.

For the silicon implementation of the igniting element according to the invention, a "silicon hotplate" structure is advantageously used to generate the required thermal ignition energy.

Other objects, advantages and novel features of the present invention will become apparent from the following detailed description of the invention when considered in conjunction with the accompanying drawings.

DETAILED DESCRIPTION OF THE DRAWINGS

Figure 1:
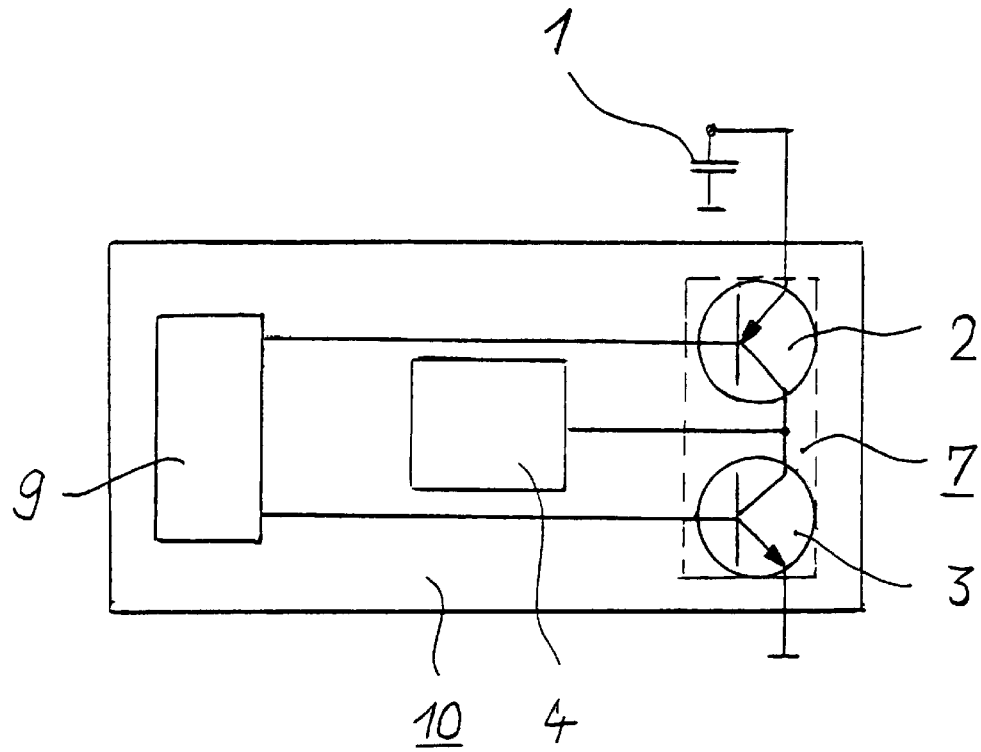
FIG. 1 is a wiring diagram of an air bag ignition circuit which includes an igniting element according to a first embodiment of the invention, with two ignition switches connected in series.

The air bag ignition circuit illustrated in FIG. 1 consists of an ignition capacitor 1, an igniting element 7 with ignition switches 2 and 3, a diagnostic logic 4, an electronic sensor and triggering system 9 as well as a silicon chip (Si-chip) 10.

The two ignition switches 2 and 3 are connected in series in the air bag ignition circuit. In a known manner, the switch 2, (a pnp-transistor) forms a "high ignition switch" and the switch 3 (an npn-transistor) forms the "low ignition switch". In this case, the emitter of the ignition switch 2 is connected with the positive pole of the ignition capacitor 1, and its collector is connected with the collector of the ignition switch 3, whose emitter is grounded at the ignition circuit. The ignition/test signal is in each case fed into the base of the transistors. The diagnostic logic 4 monitors the ignition circuit between the two ignition switches 2 and 3, and, as required, the electronic sensor and triggering system 9 generates the ignition signal.

According to the invention, the additional igniter element, which is disposed between the collector connections of the transistors in conventional igniters, is eliminated, and the power dissipated at the ignition switches 2 and 3 is used for igniting the air bag. Thus, together with correspondingly constructed signal inputs for the ignition/test signal, the ignition switches 2 and 3 form, in addition to the switching element, simultaneously also the igniting element 7. All components of the air bag ignition circuit—with the exception of the ignition capacitor 1—are implemented on the Si-chip 10.

Figure 2:
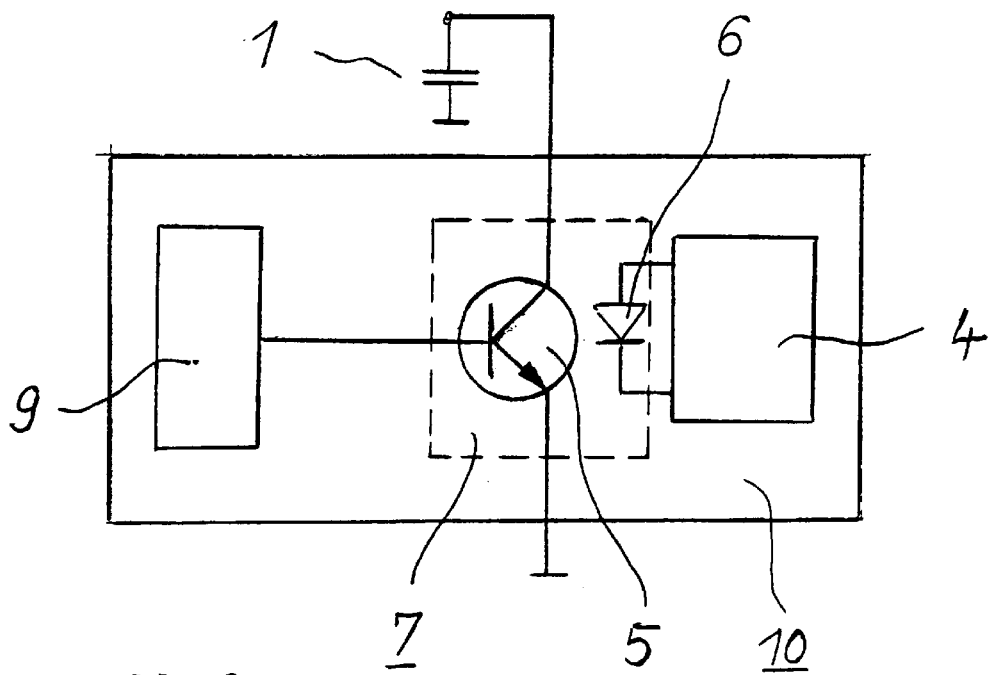
FIG. 2 is a wiring diagram of an air bag ignition circuit which includes an igniting element according to a second embodiment of the invention, with only one ignition switch and a separate sensor element for diagnostic purposes.

FIG. 2 illustrates an air bag ignition circuit consisting of an ignition capacitor 1, an igniting element 7 with only one ignition switch 5 and with a sensor element 6 (separate from the ignition switch 5), a diagnostic logic 4, an electronic triggering and sensor system 9 as well as a Si-chip 10. The ignition switch 5 is constructed as an npn-transistor, with its collector connected to the plus pole of the ignition capacitor 1 and its emitter grounded at the ignition circuit. The ignition/test signal is fed into the base of the transistor.

The sensor element 6 comprises a diode which is used for monitoring the ignition circuit, in a known manner. For this purpose, a dynamic temperature measurement is carried out by applying a test signal to the base of the transistor. The resulting switched test current causes the igniting element to heat up to a temperature which is clearly below the ignition temperature.

The dissipation power at the ignition switch 5 is used to ignite the air bag. All components of the air bag ignition circuit—with the exception of the ignition capacitor 1—are implemented on the Si-chip 10.

Figure 3:
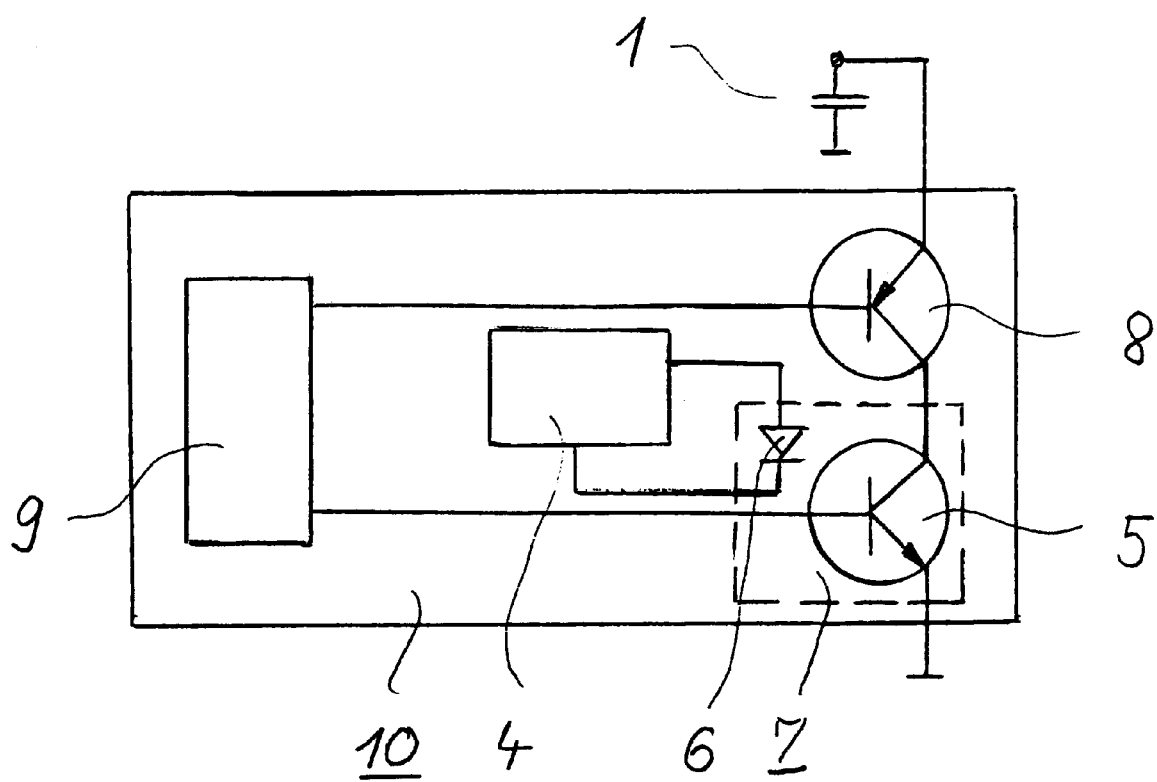
FIG. 3 is a wiring diagram of an air bag ignition circuit corresponding to FIG. 2, with an additional ignition switch for improving the reliability in the case of single faults.

If, for reasons of safety, a double switching by two independent switches is required (so that a single fault does not result in a triggering), the circuit illustrated in FIG. 2 can be expanded by an additional series-connected ignition switch 8 which emits no thermal ignition energy, as illustrated in FIG. 3.

Figure 4A:
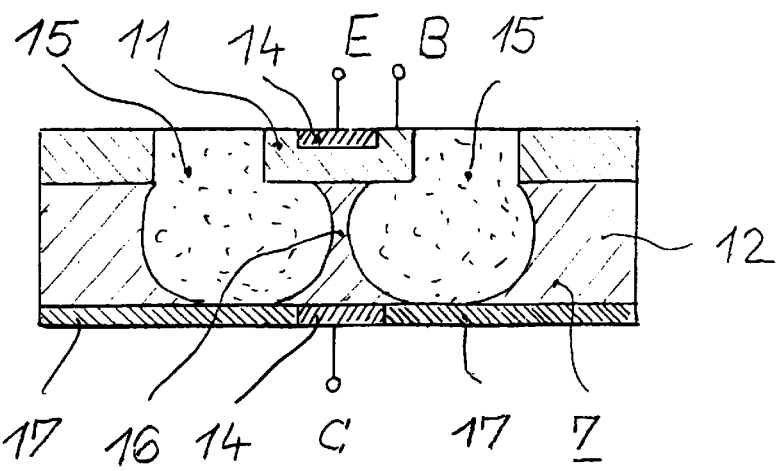
FIGS. 4a and 4b are a sectional lateral view and a top view, respectively, of an embodiment of an igniting element according to the invention in silicon.
Figure 4B:
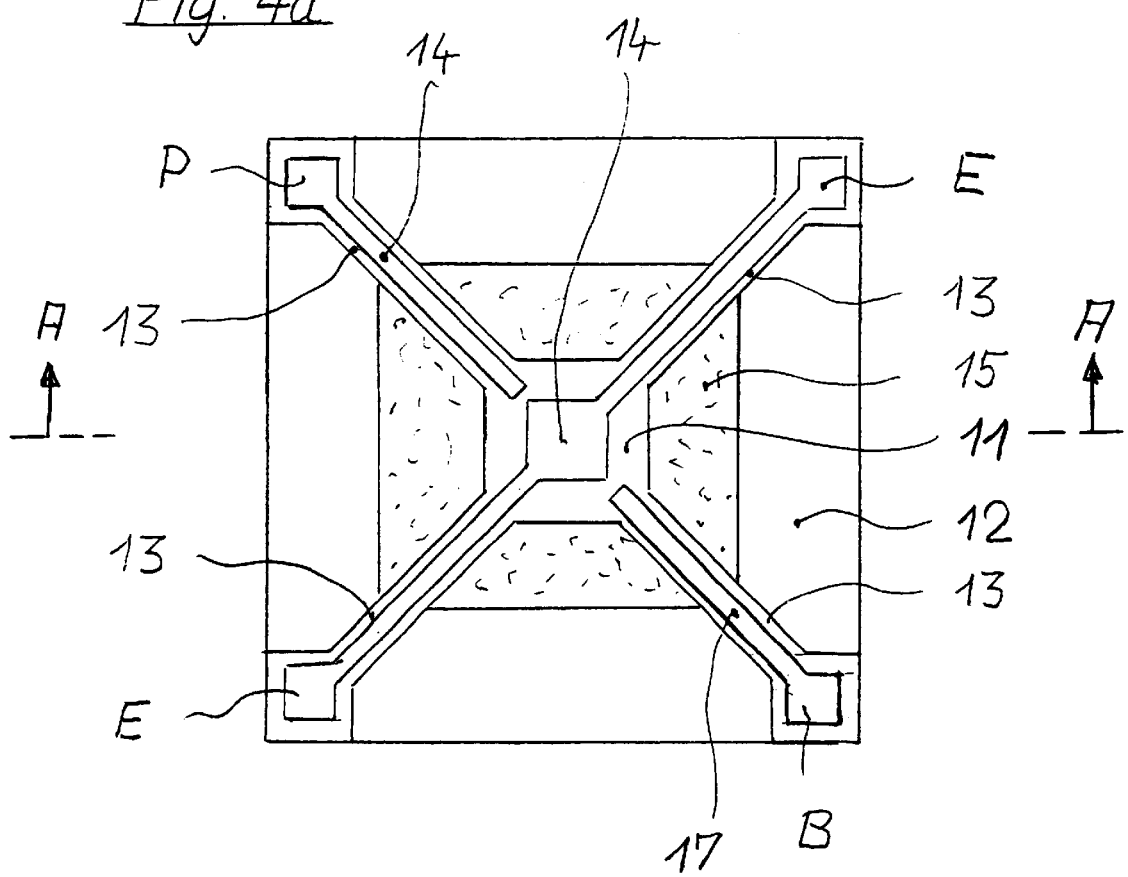

FIG. 4a is a lateral view along line A—A of an Si-implementation of an igniting element 7, whose layout is shown in FIG. 4b. It consists of a silicon membrane (Si membrane) 11, a silicon frame (Si frame) 12, four silicon webs (Si webs) 13, $p^+$-implantation 14, porous silicon regions (Si regions) 15, a silicon column (Si column) 16 and $n^+$implantation 17.

The igniting element 7 is a vertical pnp-transistor whose n-base, situated on the surface, is constructed as an Si-membrane 11 which is only a few $\mu$m thick and is suspended at the four Si webs 13 in the massive Si-frame 12. A $p^+$-implantation in the Si-membrane 11, which electrically corresponds to an n-trough, 14 which forms the emitter of the pnp-transistor is provided. The Si-membrane 11 is exposed by undercutting by means of the porous sacrificial layer technique while forming the porous Si regions 15 in the silicon substrate. However, the undercutting operation is terminated shortly before completion, so that the Si-membrane 11 remains electrically connected with the substrate backside by way of a thin Si-column 16. The Si-membrane 11 with the implanted emitter and the Si-column 16 form the vertical pnp transistor structure. On the substrate backside, below the Si-column 16, a $p^+$-implantation 14 forms the collector connection C of the pnp transistor which is bounded by a backside $n^+$-implantation 17.

When current flows through this vertical pnp-structure, the Si-membrane 11 acts as a "hotplate" and therefore in an ignition-triggering manner upon an adjoining ignition charge.

The top view of FIG. 4b shows the Si-membrane 11 with the $p^+$-implantation 14 forming the emitter, which Si-membrane 11 is suspended on the four Si-webs 13. The Si-webs 13 connect the centrally arranged Si-membrane 11 in each case in the diagonal alignment with a corner of the igniting element 7. In the right upper corner and in the left lower corner of the igniting element 7, the emitter has emitter connections E which, by means of $p^+$-implantation 14 in the corresponding Si-webs 13, are electrically connected with the central emitter. In the right lower corner, the base connection B of the pnp-transistor is constructed. For this purpose, starting from the n-doped region of the Si-membrane 11, an $n^+$-implantation 17 is implanted in the corresponding Si-web 13 to the base connection B.

For testing purposes, a test current can be sent by way of the Si-webs 13 from the left top to the right bottom via the base of the pnp transistor. By contacting the left upper Si-web 13 by a $p^+$-implantation 14 from an exterior testing connection P into the central n-doped region of the Si-membrane 11 and the use of the base connection B, a lateral pn-diode is obtained which can be used as a sensor element 6 for testing the igniting element 7 by means of a dynamic temperature measurement in a known manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An ignition element for an ignition circuit, comprising:
   at least one ignition switch in the form of a transistor; wherein
   the at least one ignition switch also constitutes a heat generating component of said ignition element, which is heated by a flow of ignition current therethrough; and
   further comprising a sensor element for monitoring the ignition circuit by means of a dynamic temperature measurement when a test signal is applied.

2. The ignition switch according to claim 1 wherein the igniting element is manufactured in silicon technology.

3. The ignition switch according to claim 2 wherein a single ignition switch is used as an ignition triggering heating element; and further comprising a series connected ignition switch which is not included in the ignition triggering heating element.

4. The igniting element according to claim 1, wherein the sensor element is electrically separated from the at least one ignition switch.

5. The igniting element according to claim 2 wherein in the sensor element is a diode.

6. An ignition element for an ignition circuit, comprising:
   at least one ignition switch in the form of a transistor; wherein
   the at least one ignition switch also constitutes a heat generating component of said ignition element, which is heated by a flow of ignition current therethrough; and
   a base of the at least one ignition switch is constructed on a Si-chip as a thin Si-membrane which is suspended in a Si-frame, is thermally insulated in the Si-chip with respect to its environment and is arranged on a surface of the Si-chip; and
   when current passes through, the ignition switch supplies ignition energy to an adjacent ignition charge.

7. The igniting element according to claim 6, wherein the Si-membrane is thermally insulated by means of porous Si-regions.

8. The igniting element according to claim 7, wherein the porous Si-regions are manufactured by means of a porous sacrificial layer technique.

9. The igniting element according to claim 8, wherein the base of the at least one ignition switch has an implantation separated from the emitter, whose doping corresponds to the emitter doping, and the thus created pn-transition is used as the sensor element.

10. The igniting element according to claim 9, wherein the at least one ignition switch is constructed in the Si-chip as a vertically arranged transistor structure.

* * * * *